United States Patent [19]

Quast

[11] Patent Number: 5,205,545
[45] Date of Patent: Apr. 27, 1993

[54] ELASTIC RUBBER BEARING ALLOWING CARDANIC MOVEMENT WITH LOW RESTORING MOMENTS

[75] Inventor: Jörn-Rainer Quast, Bad Bodendorf, Fed. Rep. of Germany

[73] Assignee: Boge AG, Eitorf, Fed. Rep. of Germany

[21] Appl. No.: 749,252

[22] Filed: Aug. 23, 1991

[30] Foreign Application Priority Data

Sep. 1, 1990 [DE] Fed. Rep. of Germany ....... 4027808

[51] Int. Cl.⁵ ............................................. F16F 13/00
[52] U.S. Cl. .................. 267/140.13; 267/219; 248/562
[58] Field of Search .................. 267/140.1 A, 140.1 R, 267/152, 219, 35, 140.13, 140.11; 248/562, 636; 180/300, 312

[56] References Cited

U.S. PATENT DOCUMENTS

| | | | |
|---|---|---|---|
| 2,562,195 | 7/1951 | Lee | 248/358 |
| 4,568,069 | 2/1986 | Poupard | 267/140.1 A |
| 4,836,512 | 6/1989 | Lun | 267/140.1 A |
| 4,887,801 | 12/1989 | Wolf et al. | 267/140.1 A |
| 4,915,365 | 4/1990 | Lee | 267/140.1 A |
| 4,986,510 | 1/1991 | Bellamy et al. | 267/140.1 A X |
| 5,028,038 | 7/1991 | de Fontenay | 180/312 X |

FOREIGN PATENT DOCUMENTS

| | | | |
|---|---|---|---|
| 0027751 | 4/1981 | European Pat. Off. | 180/312 |
| 0372167 | 6/1990 | European Pat. Off. | 267/140.1 A |

Primary Examiner—Robert J. Oberleitner
Assistant Examiner—Josie A. Ballato
Attorney, Agent, or Firm—Nils H. Ljungman and Associates

[57] ABSTRACT

Elastic rubber bearing consisting of an inner part, an outer part located at some distance from it, and interposed between them a rubber part, to which axial tension and/or pressure can be applied and which allows cardanic that is, rotational and/or non-axial, movements with very low friction forces. For this purpose, the rubber part, together with the inner part and the outer part, forms a cavity which is filled with fluid, which transmits the corresponding support forces in the direction of the principal load.

17 Claims, 2 Drawing Sheets

ELASTIC RUBBER BEARING ALLOWING CARDANIC MOVEMENT WITH LOW RESTORING MOMENTS

BACKGROUND OF THE INVENTION

1. Field of the Invention

This invention relates to an elastic, or resilient, bearing comprising an inner part, an outer part located at some distance therefrom, and a rubber, or resilient, part interposed between the two. The rubber, or resilient, part, together with the inner part and the outer part, forms a cavity which is filled with fluid. Primarily, the transmission of force between the inner part and the outer part takes place via the fluid, and the inner part, in the vicinity of the connection with the rubber, or resilient, part, has a surface which is approximately spherical. The outer part generally surrounds the inner part at some distance therefrom in the vicinity of this connection, and, at least in a compression direction, there is a rubber, or resilient, element which is fastened to the outer part and which is braced against the inner part via the fluid.

2. Background Information

Such known elastic, or resilient, bearings, as may be found in German Published Patent Application No. DE-OS 38 41 194 (corresponding to U.S. Pat. No. 5,149,067, can generally allow for tension and/or pressure loads to be applied thereto and can also allow cardanic, that is, rotational and/or nonaxial, loads with substantially low restoring forces. When the cavity is filled with fluid, the fluid transmits the corresponding supporting forces in the principal loading direction. However, neither a hydraulic damping nor a neutralization of vibrations usually takes place.

Also known are elastic, or resilient, bearings, such as may be found in U.S. Pat. No. 2,562,195, in which ring-shaped cavities are bordered by an external ring having an angular cross section and an inner ring made of elastomer material, whereby the inner ring of both cavities is designed as a common ring. In addition, however, a bearing shell and a support element border the cavities, so that, overall, there is a unit which is divided into two chambers. A disadvantage of this configuration, however, may be found in that only a small axial static load can generally be applied to this bearing. In addition, only a relatively small range of spring travel is generally possible in a radial direction.

OBJECT OF THE INVENTION

An object of the present invention is to design an elastic, or resilient, bearing to which an axial tension and/or pressure may be applied, and which allows for cardanic movements with substantially low restoring moments.

This object is achieved by the invention, in that the cavity is divided into two partial chambers by a partition which has a throttle.

SUMMARY OF THE INVENTION

One advantage of this configuration may be found in that static loads can be applied to both the rubber, or resilient, part and the fluid. As a result of the use of a special geometric shape and/or of the construction of the rubber, or resilient, part, a corresponding load-bearing capacity can be achieved, whereby cardanic movements can be executed with substantially no problems.

During these cardanic movements, the rubber, or resilient, part is primarily stressed in the shear direction. Generally, the rubber, or resilient, part is softer, or more resilient, in the shear direction than in the compression direction, and, therefore, there tend to be only low restoring moments. On account of the division of the cavity into two partial chambers connected to one another by means of a throttle, a damping action can also be achieved.

An additional advantage may be found in that the bearing element can be installed under an axial force in the decompression direction acting on the inner part. On one hand, such a force produces an overpressure in the fluid, which positively displaces the beginning of cavitation. Moreover, in the event of a pressure stroke, i.e. in a generally opposite direction, the tension component in the rubber, or resilient, part caused by the pre-stress is reduced.

In one configuration of the invention, the throttle is designed in the form of at least one hole.

In accordance with an additional important feature, the throttle is designed so that it runs around the longitudinal axis of the bearing in spiral fashion. A will be explained further below, the bearing preferably has a longitudinal axis running through the inner part, whereby the bearing preferably is rotationally symmetrical with respect to the longitudinal axis.

In accordance with an embodiment which has particular advantages from a functional standpoint, the partition has a recess in which an elastic, or resilient, membrane or insert is inserted.

In an additional embodiment of the present invention, the inner part is preferably installed under tension. In such a case, it is advantageous that the overpressure which exists after assembly displaces the start of any cavitation which may occur. Moreover, tensile stresses which occur during spring deflection of the bearing are reduced.

In summary, one feature of the invention resides broadly in a bearing comprising: a housing element; a movable connecting element for connecting the bearing to a member, the movable connecting element being movably disposed at least partly within the housing element; the movable connecting element generally being separated from the housing element by a substantial distance; a lower resilient element connected between the movable connecting element and the housing element for transmitting a force between the movable connecting element and the housing element during movement of the movable connecting element; fluid in communication with the movable connecting element and the housing element for transmitting a force between the movable connecting element and the housing element during movement of the movable connecting element; a greater fluid cavity defined by the movable connecting element, the lower resilient element and the housing element, the fluid being disposed within the greater fluid cavity; an upper resilient element attached to the housing element for receiving a force transmitted by the fluid; the movable connecting element having a shaft portion and a head portion attached to the head portion; a longitudinal axis being defined through and generally parallel to the shaft portion of the movable connecting element; the head portion of the movable connecting element being at least partly spherical; the movable connecting element being disposed for at least: movement in a first linear direction; movement in a second linear direction generally opposite the first linear direction; rotational movement about the longitudinal axis; rotational movement about at least one other axis generally transverse to the longitudinal axis; partition means separating the greater fluid cavity into at least an upper fluid cavity and a lower fluid cavity, the partition means being disposed between the movable connecting element and the upper resilient element; the partition means having throttle means for conveying fluid between the upper fluid cavity and the lower fluid cavity; and the partition means being separated by a substantial distance from each of the upper resilient element and the movable connecting element.

The invention as described hereinabove in the context of the preferred embodiments is not to be taken as limited to all of the provided details thereof, since modifications and variations thereof may be made without departing from the spirit and scope of the invention.

BRIEF DESCRIPTION OF THE DRAWINGS

Preferred embodiments are illustrated schematically in the accompanying drawings, wherein.

DESCRIPTION ON OF THE PREFERRED EMBODIMENTS

Figure 1:
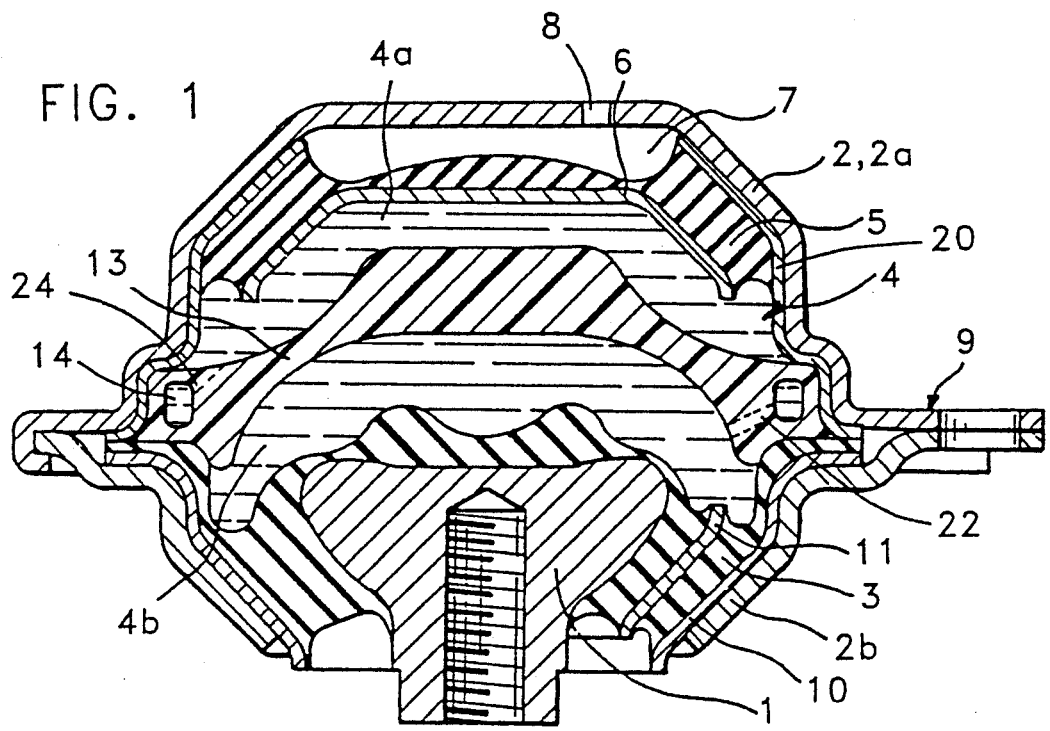
FIG. 1 shows a cross section of an elastic, or resilient, bearing.

The elastic, or resilient, bearing illustrated in FIG. 1 essentially comprises an inner part 1, an outer part 2 and a rubber, or resilient, part 3 interposed therebetween. The inner part 1, the rubber, or resilient, part 3 and the outer part 2 preferably form a cavity 4, which cavity is preferably filled with fluid. The outer part 2 essentially comprises two individual parts 2a and 2b. The rubber, or resilient, part 3 is preferably attached by vulcanization to the inner part 1 and to the outer part 2b. If necessary, there can also be an intermediate plate 10 disposed between the inner part 1 and the outer part 2b.

Preferably, the rubber, or resilient, part 3 absorbs the corresponding forces in the decompression and compression directions, while the fluid in the cavity 4 is used for transmission of compression forces. Also, preferably, the rubber, or resilient, part 3 runs over substantially the entire circumference of the inner part 1 and of the outer part 2. The rubber, or resilient, part 3 can also have a reinforcement part, or plate, 11 disposed therewithin. It should be understood, as will be discussed in more detail further below, that the inclusion of the reinforcement plate 11 represents a further embodiment of the present invention. Therefore, FIG. 1 may be taken to be representative of two separate embodiments, differing in that one embodiment provides for the inclusion of reinforcement plate 11 and the other embodiment does not provided for the inclusion of reinforcement plate 11. This is also the case with the remaining figures.

Static and dynamic loads can be elastically absorbed by a rubber, or resilient, element 5 attached by vulcanization to the outer part 2a by means of an intermediate plate 20. Preferably, rubber, or resilient, element 5 has a metal part 6, so that the pressure can be transmitted by means of a correspondingly large surface area of the metal part 6 to the rubber, or resilient, element 5. Preferably, a chamber 7, filled with air and gas, is located between the metal part 6 and the outer part 2. Also, preferably, the chamber 7 is externally vented to the atmosphere by means of a hole 8 in the outer part 2, so that substantially no pressure can build up in the chamber 7.

The outer parts 2a and 2b form a fastening flange 9, in which fastening holes can be made, if necessary.

A partition 13, preferably made of a rubber or resilient material, divides the cavity 4 into two partial chambers 4a and 4b, whereby for the generation of a damping force there is a throttle 14 in the form of a hole or in the form of a channel running around the circumference. For example, as shown in FIG. 1, throttle 14 may be a circumferential channel through partition 13, wherein a hole 22 may provide fluid communication between cavity 4b and throttle 14, and wherein a hole 24 may provide fluid communication between throttle 14 and cavity 4a. Alternatively, several such holes 22 and 24 may be disposed about the circumference of partition 13 to provide the desired degree of fluid communication. The dimensions of the holes 22 and 24 are also preferably chosen to provide the most efficient operation of throttle 14. Preferred dimensions will be discussed further below.

Figure 2:
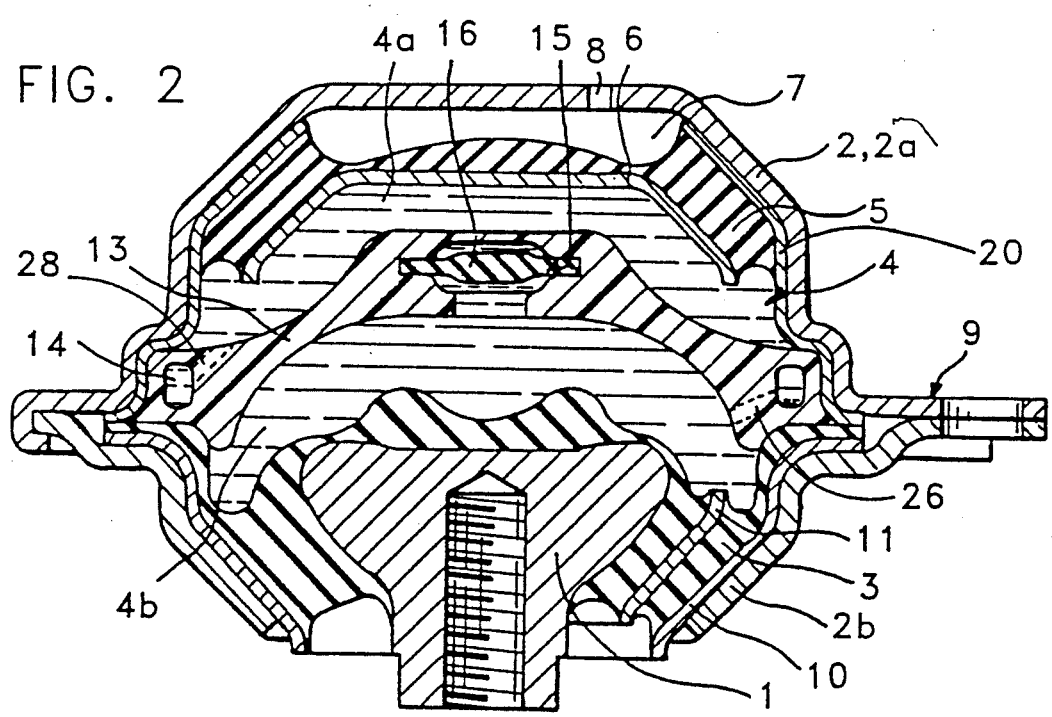
FIG. 2 shows a variant of the elastic, or resilient, bearing illustrated in FIG. 1

FIG. 2 shows a embodiment of the bearing illustrated in FIG. 1. Here, too, the chamber 7 is externally vented to the atmosphere by means of the hole 8 in the outer part 2, so that substantially no pressure can build up in the chamber 7. Preferably, partition 13 has a membrane, or insert, 16 for decoupling, or neutralization.

Preferably, the membrane 16 is thereby mounted tightly, but movably, in a recess 15. For the throttle 14, there is preferably a channel running in a spiral fashion. More particularly, throttle 14, in tracing a spiral path through partition 13, may have one or more entry passages 26 opening into cavity 4b and one or more entry passages 28 opening into cavity 4a. It should be understood that this spiral configuration of throttle 14 of the embodiment of FIG. 2 may be used interchangeably with the configuration of throttle 14 discussed above in relation to the embodiment of FIG. 1. It should also be understood that the spiral need not necessarily have the preferred type of twist shown in FIG. 2; it may alternatively have an opposite twist. Also, preferably, the positions of entry passages 26 and 28, and the dimensions thereof, should be chosen to provide the most efficient operation of throttle 14. Preferred dimensions will be discussed further below.

The disclosure now turns to a more detailed description of the components of the bearing of the present invention. FIGS. 1 and 2 may generally be considered to be scale representations of the bearing of the present invention. Possible dimensions of the bearing are described further below. Additionally, FIGS. 3 and 4 are substantially the same representations as FIGS. 1 and 2, respectively, but enlarged by a factor of about 1.41.

Figure 3:
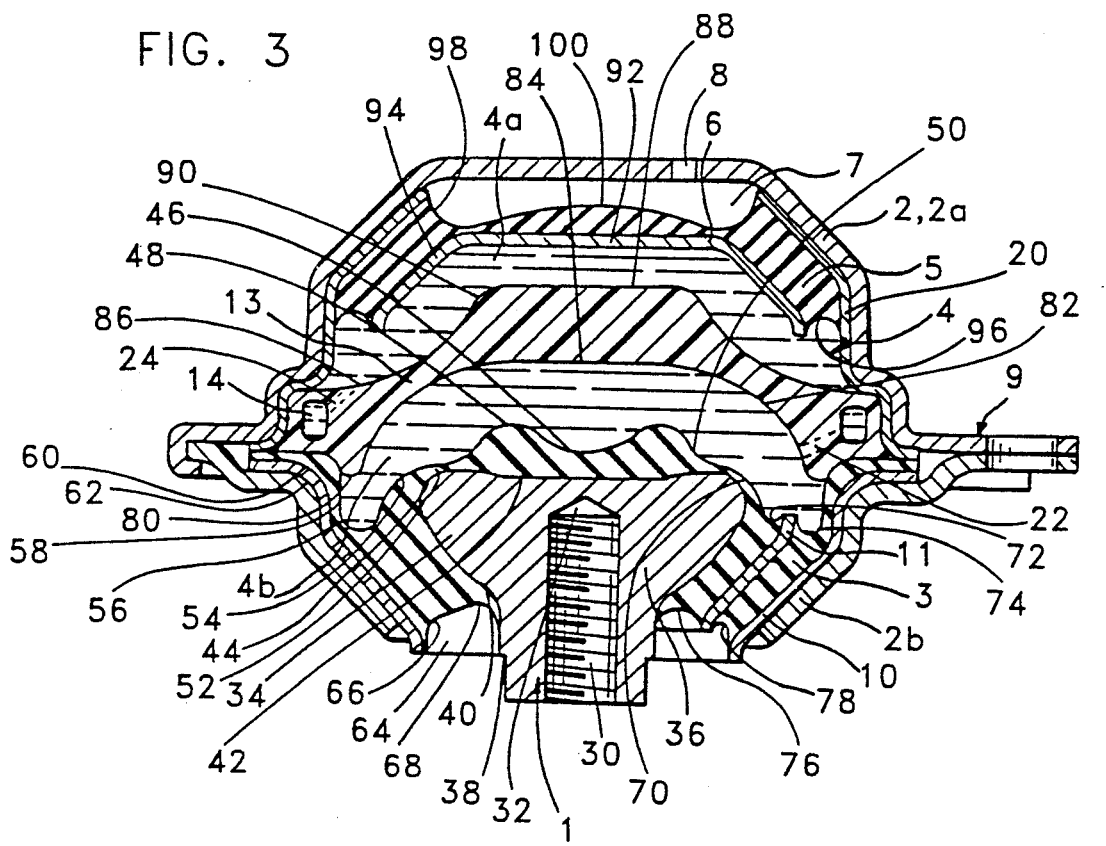
FIG. 3 is a more detailed representation of FIG. 1.
Figure 4:
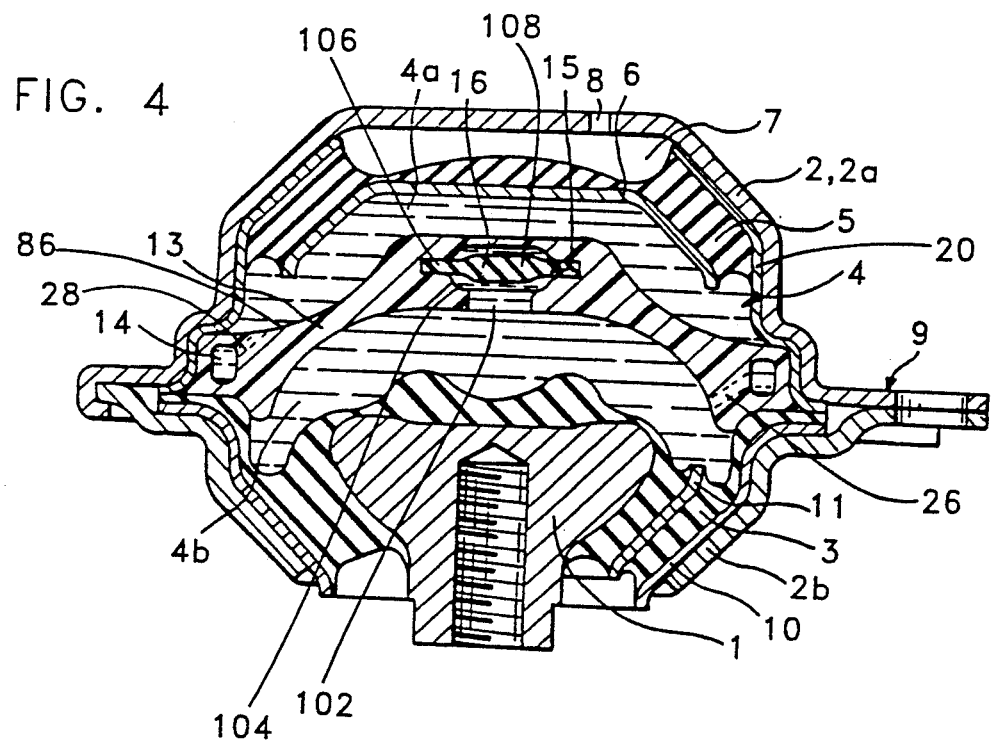
FIG. 4 is a more detailed representation of FIG. 2.

FIG. 3 references several parts of the apparatus not heretofore discussed. Disposed within inner part 1 is a threaded member 30 for mounting inner part 1 to another object. The threaded member 30 has a longitudinal axis thereof. Particularly, this longitudinal axis preferably constitutes a central longitudinal axis of rotational symmetry for substantially the entire bearing structure. Thus, apart from some slight variations discussed further below, the bearing of the present invention is rotationally symmetrical as shown in substantially all of the drawings. The longitudinal axis is not represented in the drawings, as its location should be inherently clear. Additionally, anything hereinafter referenced as "longitudinal", absent any other explanation, should be taken to be indicative of being parallel to the longitudinal axis. Accordingly, anything hereinafter referenced as "transverse", absent any other explanation, should be taken to be indicative of being transverse to the longitudinal axis.

Threaded member 30 includes a conical tip portion 32 oriented towards the interior of the bearing. Thus, in accordance with the scale of the drawings, threaded member 30 may have a longitudinal dimension, to the base of tip portion 32, of about 1½ inches. Tip portion 32 may have a conical height of about ¼ inch.

In a preferred embodiment of the invention, the general shape of inner part 1 may be considered to be defined, essentially, by a truncated sphere 34 extending from a neck portion 36. From an area 38 generally flush with the external surface of outer part 2, the neck 36 of the inner part 1 preferably protrudes outward by about ¼ inch and has a diameter of about ⅜ inch. Within the bearing, the radius of neck portion 36 is preferably about 1/16 inch greater than that of the protruding portion.

With respect to neck 36, truncated sphere 34 initiates at an area on neck 36 about ⅜ inch away from flush area 38. The junction between truncated sphere 34 and neck 36 is essentially smoothed by a curved portion 40 having a radius of curvature of about ¼ inch.

Truncated sphere 34 generally has a radius of curvature of about 2¼ inches and widens in a direction generally away from area 38. Its area of truncation is defined by a generally flat inward portion 42. Edges 44 of truncated sphere 34 are preferably rounded and have a radius of curvature of about ⅜ inch.

Inward portion 42 is generally flat, in a direction transverse to the longitudinal axis, except for a wide, shallow valley, about 1/32 inch deep, defining a circular area about 1 1/16 inches in diameter, centered about the longitudinal axis. Overall, inward portion 42 preferably has a diameter of about 1¾ inches.

Rubber, or resilient, part 3 substantially surrounds all of inner part 1. Upon inward portion 42, rubber, or resilient, part 3 generally comprises a valley portion 46 surrounded by a raised ring portion 48. Valley portion 46 preferably has a radius of curvature of about 1 inch, provides a thickness of rubber or resilient material of about ¼ inch at the center and has a diameter of about ⅝ inch where it merges with ring portion 48.

Preferably, ring portion 48 has a radius of curvature of about ⅜ inch and a maximum thickness of about 5/16 inch. Ring portion 48 smooths out, by means of a curved portion 50 having a radius of curvature of about ⅜ inch, to an area 52 of reduced thickness of about 3/64 inch, which area is at least approximately in the area where curved edge 44 of inner part 1 meets inward portion 42 thereof.

Around the remaining portions of truncated sphere 34, the rubber, or resilient, part 3 generally has a substantial thickness. Also, there are two preferred configurations for the rubber, or resilient, part 3 here, in which one configuration provides for reinforcement plate 11.

In a first preferred configuration of rubber, or resilient, part 3, an increasing thickness thereof with respect to truncated sphere 34 is defined by a curve 54 having a radius of curvature of about ⅜ inches. After describing about a quarter circle, curve 54 yields to a trough or cavity 56, having a substantially semicircular cross-section and a radius of curvature of about 15/64 inches. A wall of trough or cavity 56 then continues in a generally straight section 58, substantially parallel to the wall of outer portion 2. In straight section 58, the rubber, or resilient, part 3 has a thickness of about 1/16 inch.

At this juncture, it should be appreciated that, preferably, intermediate plate 10 is interposed between outer part 2 and rubber, or resilient, part 3. Intermediate plate 10, having a thickness of about 1/16 inch, is disposed to hug and follow the layout of outer part 2. Thus, as outer part 2, as shown, substantially describes a right angle in forming flange 9 mentioned further above, intermediate plate 10 likewise follows this jutting portion of outer part 2 and, likewise, describes a substantially right angle bend 60. The right angle bend 60 has an inner radius of curvature of about 7/16 inch.

Accordingly, rubber, or resilient, part 3, hugs and follows intermediate plate 10 and, thus, describes a substantially right angle bend 62 having an inner radius of curvature of about ¼ inch. Within flange portion 9, rubber, or resilient, element 3 has a thickness of about 1/16 inch, but, about the bend 62, the thickness is about ⅛ inch, having gradually increased from either side of the bend 62.

The rubber, or resilient, part 3 substantially completely covers all of intermediate plate 10 and substantially covers inner part 1 up to and including curve 40. The rubber, or resilient, part 3 preferably tapers towards both intermediate plate 10 and rubber, or resilient, part 3 in its extent of coverage. Thus, an indentation 64 is formed by the tapering portions of rubber, or resilient, part 3. Preferably, the tapering of rubber, or resilient, element 3 towards intermediate plate 10 and inner part 1 is defined by curved portions 66 and 68, respectively. Curved portions 66 and 68 may both have a radius of curvature of about 13/64 inch.

In describing the second preferred configuration of rubber, or resilient, element 3, reference will only be made to those characteristics distinct from the first preferred configuration described above. Thus, in the second preferred configuration of rubber, or resilient, part 3, reinforcement plate 11 is disposed therewithin, preferably about halfway between inner part 1 and intermediate plate 10. Preferably, reinforcement plate 11 has a thickness of about 1/16 inch.

In this second configuration, instead of the curved portion 54 described above, there is a curved portion 70 having a radius of curvature of about 11/16 inch. Curved portion 70 then yields to a double trough, shown by reference numerals 72 and 74, defined by reinforcement plate 11. The first trough 72 has a radius of curvature of about 7/64 inches, has a generally semicircular cross-section and tapers up to reinforcement plate 11. The second trough 74 has a radius of curvature of about 9/64 inches, also has a generally semicircular cross-section, and also tapers up to reinforcement plate 11. Further, trough 74 preferably terminates in straight portion 58 described further above.

Likewise, in the second preferred configuration of rubber, or resilient, element 3, an indentation, corresponding to indentation 64, is formed but, because of the presence of reinforcement plate 11, has two generally semicircular grooves 76 and 78. Groove 76 preferably has a radius of curvature of about 9/32 inch and tapers both to inner part 1 and to reinforcement plate 11. Groove 78 preferably has a radius of curvature of about 5/64 inch and, accordingly, tapers to both reinforcement plate 11 and to intermediate plate 10.

A preferable configuration of partition 13, as shown in FIG. 3, may be considered to comprise three main portions: a main central portion about the longitudinal axis of the bearing, a wall portion attached to outer part 2 and having the throttle passage 14 disposed therewithin, and a web portion joining the main portion and wall portion. Throttle 14 preferably has a longitudinal dimension of about 7/32 inch and a dimension transverse thereto of about 5/32 inch. Its general cross-sectional shape is preferably rectangular with rounded corners.

One or more of the hole or holes 22 may have a diameter of about 1/16 inch. Each such hole, as shown, is preferably about ¼ inch long and intersects the edge of partition 13 to be generally perpendicular thereto. Each hole 22 is also preferably flush with a lower transverse side of throttle 14. Each of one or more of the hole or holes 24 also preferably has a diameter of about 1/16 inch and, as shown, is preferably flush with an upper transverse side of throttle 14 and exits throttle 14 at an angle of about 45°.

Outer part 2a, like part 2b, preferably has an intermediate plate disposed thereupon, namely, intermediate plate 20. Intermediate plate 20 also hugs and follows the inner surface of outer part 2a out to flange portion 9. Intermediate plate 20 preferably has a thickness of about 1/16 inch.

However, in following the wall of outer part 2a, intermediate plate 20, as shown, makes an outward protrusion, having a generally rectangular cross-section, before being flanged outward within flange 9. Thus, within this generally rectangular protrusion, the wall portion of partition 13 is attached. Preferably, there is a material thickness of about 3/32 inch between throttle 14 and intermediate plate 20. Further, the material of partition 13 preferably tapers towards the flange portion 9, being bounded by intermediate plate 20 and rubber, or resilient, part 3. Also, preferably, the partition 13 is attached to the rubber, or resilient part 3 along the length of curved portion 60 thereof. At that point, partition 13 separates from rubber, or resilient, part 3 via a curved portion 80, describing a generally shallow arc, preferably having a radius of curvature of about 5/32 inch.

The underside of partition 13, or the side facing inner part 1, is essentially defined by a gulf having an archlike cross-section. An outer curved portion 82, having a radius of curvature of about 2 inches, gives way, once transverse to the longitudinal axis of the bearing, to a generally horizontal lower circular portion 84 having a diameter of about 1 1/16 inches. Circular portion 84 is preferably centered about the longitudinal axis of the bearing.

On the other hand, the outer side of partition 13, or the side facing generally away from inner part 1, more acutely defines the central portion and web portions described above. Particularly, in forming the web portion, there is a curved portion 86, being concave towards curved portion 82, having a radius of curvature of about 2½ inches. Thus, it may be seen that the web portion preferably has a minimum thickness of about 3/16 inch as a result of the converging concave curved portions 82 and 86. An upper circular portion 88, substantially horizontal and generally parallel to lower circular portion 84, defines the outer side of the central portion and, like portion 84, has a diameter of about 1⅝ inches. A curved corner portion 90, having a radius of curvature of about 7/16 inch, provides a smooth transition between curved portion 86 and upper portion 88.

The central portion of partition 13 preferably has a thickness of about 7/16 inch. It should be understood that the generally horizontal portions 84 and 88 of the central portion of partition 13 need not necessarily be horizontal, but may in fact have any other configuration, such as a slightly curved, bulging configuration away from inner part 1, in order to provide efficient operation of the bearing of the present invention.

Finally, attention is directed to the upper part of the bearing, or that part disposed at the end of the bearing opposite inner part 1. Metal part 6, disposed on rubber, or resilient, element 5, generally has a thickness of about 1/16 inch. Preferably, a generally horizontal cap portion 92 of metal part 6 has a diameter of about 1⅝ inch, while a sloping side portion 94, effectively forming the metal part 6 into a bowl-type shape, has a linear dimension of about ¾ inch. At its edge, the sloping side portion 94 preferably turns and forms a substantially short rim generally parallel with the longitudinal axis of the bearing.

Preferably, indented in rubber, or resilient element 5 in the vicinity of the rim of sloping portion 94 of the metal part 6 is a trough 96, having a generally semicircular cross-section, indented therein. Trough 96 preferably has a radius of curvature of about 3/16 inch. Thus, rubber, or resilient, element 5 generally fills substantially all space between metal plate 6 and intermediate plate 20 in the region of sloping side portion 94 of metal plate 6.

Chamber 7 thus constitutes a substantial cavity in rubber, or resilient, element 5. Particularly, as shown, the wall of outer portion 2, generally parallel with metal plate 6, has a corner at the end opposite inner part 1 to form a generally horizontal circular region. At the junction of this generally horizontal circular region with the rest of the outer part 2, intermediate plate 20 terminates and rubber, or resilient, element 5 goes inward to form the above-mentioned cavity. Particularly, a curved portion 98, having a radius of curvature of about ¼ inch, forms a boundary of chamber 7 until the material thickness of rubber, or resilient, element 5 is only about 1/32 inch. Thence, the rubber, or resilient, element 5 is defined by a convex cap region 100, which cap region bulges in towards the chamber 7. This cap region 100 preferably has a radius of curvature of about 3½ inches and, at its thickest point, preferably corresponding to the location of the longitudinal axis of the bearing, has a thickness of about 3/16 inch. Hole 8, preferably located eccentrically in the chamber 7, preferably has a diameter of about ⅛ inch.

FIG. 4 references parts of FIG. 2 not previously discussed. Recess 15 is defined by an entry hole 102 and a main chamber. Preferably, entry hole 102 is centered about the longitudinal axis of the bearing and has a diameter of about ⅜ inch and a depth of about ¼ inch. The main chamber, also preferably centered about the longitudinal axis, widens by means of a ring cavity defined by generally semicircular curved portion 104 having a radius of curvature of about ¼ inch. Thus, the ring cavity initiates at the boundary of the entry hole 102.

Membrane, or insert 16 preferably has a diameter of about 1 inch and, where exceeding the bounds of the main chamber, is preferably lodged into the material of partition 13. Membrane, or insert, 16 is preferably defined by an outer disc portion 106 and a central widened portion 108. Widened portion 108 preferably has a thickness of about ⅛ inch and a diameter of about ⅜ inch. Widened portion 108 then preferably tapers to disc portion 106, which disc portion preferably has a thickness of about 1/16 inch. In the vicinity of the generally horizontal portion of the main chamber, opposite entry hole 102, partition 13 preferably has a thickness of about 1/16 inch.

Entry passage or passages 26 of throttle 14, as shown, may each have a diameter of about 1/16 inch and may each intersect the edge of partition 13 to be generally perpendicular thereto. Entry passage or passages 28 may also each have a diameter of about 1/16 inch and may exit towards partial chamber 4a at an angle of about 45°.

In accordance with the unique design of the preferred embodiments of the present invention, it will now be appreciated that:

by virtue of trough 56 or, alternatively, troughs 72 and 74, cavity 4b effectively surrounds a substantial portion of inner part 1;

the underside of partition 13, that is, the side defined by curved portions 80 and 82 and by circular portion 84, is kept in a substantially spaced-apart relationship with inner part 1 and rubber, or resilient, part 3; and the upper side of partition 13, that is the side defined by curved portions 86 and 90 and by circular portion 88, is kept in a substantially spaced-apart relationship with rubber, or resilient, element 5.

Particularly, the following measurements, which are essentially represented proportionally in the drawings, illustrate the spaced-apart relationship of the partition 13 with other parts of the bearing, wherein:

the distance from inward portion 88 to metal plate 92 may be about ¼ inch;

a minimum distance from upper curved portion 86 to metal plate 92 may be about 5/16 inch and a maximum distance thereof may be about 3/8 inch;

a maximum distance from valley portion 46 of rubber, or resilient, element 3 to lower circular portion 84 of the partition 13 may be about 9/16 inch;

a minimum distance from ring portion 48 of rubber, or resilient, element 3 to lower circular portion 84 of the partition 13 may be about ⅜ inch;

a maximum distance from curved portion 50 of rubber, or resilient, element 3 to outer curved portion 82 of the partition 13 may be about ½ inch;

in an embodiment of the present invention utilizing reinforcement plate 11, a minimum distance from curved portion 70 of rubber, or resilient, element 3 to the partition 13 may be about 5/16 inch; and in an embodiment of the present invention not utilizing reinforcement plate 11, a minimum distance from curved portion 54 of rubber, or resilient, element 3 to the partition 13 may be about 3/16 inch.

One aspect of the invention resides broadly in the elastic rubber bearing consisting of an inner part, an outer part located at some distance from it and a rubber part interposed between them, which together with the inner part and the outer part forms a cavity which is filled with fluid, whereby the transmission of force between the inner part and the outer part takes place primarily via the fluid, and the inner part, in the vicinity of the connection with the rubber part, has a surface which is approximately spherical, the outer part surrounds the inner part at some distance from it in the vicinity of this connection and whereby in at least the compression direction there is a rubber element which is fastened to the outer part and which is braced against the inner part via the fluid, characterized by the fact that the cavity (4) is divided into two partial chambers (4a and 4b) by means of a partition (13) having a throttle (14).

Another aspect of the invention is a rubber bearing characterized by the fact that the throttle (14) is in the form of a hole.

A further aspect of the invention is a rubber bearing characterized by the fact that the throttle (14) is designed so that it runs in a spiral fashion around the longitudinal axis.

A yet further aspect of the invention is a rubber bearing characterized by the fact that the partition (1) has a recess (15) in which an elastic membrane (16) is inserted.

Yet another further aspect of the invention is a rubber bearing characterized by the fact that the inner part is installed under tension.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof since modifications and variations thereof may be made without departing from the spirit and scope of the invention.

What is claimed is:

1. A bearing comprising:
a housing element;
a movable connecting element for connecting the bearing to a member, said movable connecting element being movably disposed at least partly within said housing element;
said movable connecting element generally being positioned in a spaced-apart relationship with said housing element;
a lower resilience element connected between said movable connecting element and said housing element for transmitting a force between said movable connecting element and said housing element during movement of said movable connecting element;
fluid in communication with said movable connecting element and said housing element for transmitting a force between said movable connecting element and said housing element during movement of said movable connecting element;
a greater fluid cavity defined by said movable connecting element, said lower resilient element and said housing element, said fluid being disposed within said greater fluid cavity;
an upper resilient element attached to said housing element for receiving a force transmitted by said fluid;
said movable connecting element having a shaft portion and a head portion attached to said shaft portion;
a longitudinal axis being defined through and generally parallel to said shaft portion of said movable connecting element;
said head portion of said movable connecting element being at least partly spherical;
said movable connecting element being disposed for at least:
movement in a first linear direction;
movement in a second linear direction generally opposite said first linear direction;

rotational movement about said longitudinal axis; rotational movement about at least one other axis generally transverse to said longitudinal axis;

partition means separating said greater fluid cavity into at least an upper fluid cavity and a lower fluid cavity, said partition means being disposed between said movable connecting element and said upper resilient element;

said partition means having throttle means for conveying fluid between said upper fluid cavity and said lower fluid cavity;

said partition means being positioned is a spaced-apart relationship with each of said upper resilient element and said movable connecting element;

said head portion of said movable connecting element being generally in the shape of a truncated sphere;

said partition means comprising:
  a first portion being disposed along the circumference of the housing element;
  a second portion being disposed directly about the longitudinal axis of the bearing; and
  a third portion connecting said first portion and said second portion;

said head portion of said movable connecting element having a generally flat face portion forming said truncated sphere shape, said generally flat face portion facing generally towards said partition means;

a trough portion surrounding said movable connecting element, said trough portion being indented in said lower resilient element such that said lower fluid cavity completely surrounds said movable connecting element; and said third portion of said partition means being defined by an upper concave portion and a lower concave portion, said upper concave portion and said lower concave portion converging to form an area of reduced thickness.

2. The bearing according to claim 1, wherein said throttle means comprises at least one hole being fluid communication with said lower fluid cavity.

3. The bearing according to claim 2, further comprising:
said partition means having a recess in communication with said lower fluid cavity; and
an insert being disposed within said recess and substantially across said recess.

4. The bearing according to claim 3, wherein said lower resilient element is prestressed in tension by said movable connecting element.

5. The bearing according to claim 4, wherein the bearing is generally rotationally symmetrical about the longitudinal axis of the bearing.

6. The bearing according to claim 5, wherein said lower fluid activity completely surrounds said movable connecting element.

7. The bearing according to claim 6, wherein said partition means comprises:
said first portion being connected to said housing element;
said second portion having a thickness; and
said third portion generally having a substantially reduced thickness relative to said second portion.

8. The bearing according to claim 7, wherein said partition means has a lower surface generally facing said movable connecting element, said lower surface having a generally arched cross-sectional shape defined by said first portion, said second portion and said third portion of said portion means.

9. The bearing according to claim 1, wherein said throttle means comprises a throttle passage, said throttle passage being in communication with each of said upper fluid cavity and said lower fluid cavity, said throttle passage forming a spiral about said longitudinal axis.

10. The bearing according to claim 9, further comprising:
said partition means having a recess in communication with said lower fluid cavity; and
an insert being disposed within said recess and substantially across said recess.

11. The bearing according to claim 10, wherein said lower resilient element is prestressed in tension by said movable connecting element.

12. The bearing according to claim 11, wherein the bearing is generally rotationally symmetrical about the longitudinal axis of the bearing.

13. The bearing according to claim 12, wherein said lower fluid cavity completely surrounds said movable connecting element.

14. The bearing according to claim 13, wherein said partition means comprises:
said first portion being connected to said housing element;
said second portion having a thickness; and
said third portion generally having a substantially reduced thickness relative to said second portion.

15. The bearing according to claim 14, wherein said partition means has a lower surface generally facing said movable connecting element, said lower surface having a generally arched cross-sectional shape defined by said first portion, said second portion and said third portion of said partition means.

16. A bearing comprising:
a housing element;
a movable connecting element for connecting the bearing to a member, said movable connecting element being movably disposed at least partly within said housing element;
said movable connecting element generally being positioned in a spaced-apart relationship with said housing element;
a lower resilience element connected between said movable connecting element and said housing element for transmitting a force between said movable connecting element and said housing element during movement of said movable connecting element;
fluid in communication with said movable connecting element and said housing element for transmitting a force between said movable connecting element and said housing element during movement of said movable connecting element;
a greater fluid cavity defined by said movable connecting element, said lower resilient element and said housing element, said fluid being disposed within said greater fluid cavity;
an upper resilient element attached to said housing element for receiving a force transmitted by said fluid;
said movable connecting element having a shaft portion and a head portion attached to said shaft portion;
a longitudinal axis being defined through and generally parallel to said shaft portion of said movable connecting element;

said head portion of said movable connecting element being at least partly spherical;

said movable connecting element being disposed for at least:
  movement in a first linear direction;
  movement in a second linear direction generally opposite said first linear direction;
  rotational movement about said longitudinal axis;
  rotational movement about at least one other axis generally transverse to said longitudinal axis;

partition means separating said greater fluid cavity into at least an upper fluid cavity and a lower fluid cavity, said partition means being disposed between said movable connecting element and said upper resilient element;

said partition means having throttle means for conveying fluid between said upper fluid cavity and said lower fluid cavity;

said partition means being positioned is a spaced-apart relationship with each of said upper resilient element and said movable connecting element;

said throttle means comprising at least one hole being in fluid communication with said lower fluid cavity;

said partition means having a recess in communication with said lower fluid cavity;

an insert being disposed within said recess and substantially across said recess;

said lower resilient element being prestressed in tension by said movable connecting element;

the bearing being generally rotationally symmetrical about the longitudinal axis of the bearing;

said head portion of said movable connecting element being generally in the shape of a truncated sphere;

said lower fluid cavity completely surrounding said movable connecting element;

said partition means comprising:
  a first portion being disposed along the circumference of the housing element and being connected thereto;
  a second portion being disposed directly about the longitudinal axis of the bearing, said second portion having a thickness; and
  a third portion connecting said first portion and said second portion; said third portion generally having a substantially reduced thickness relative to said second portion;

said partition means having a lower surface generally facing said movable connecting element, said lower surface having a generally arched cross-sectional shape defined by said first portion, said second portion and said third portion of said partition means;

a first intermediate plate interposed between said lower resilient element and said housing;

said lower resilient element being attached by vulcanization to said first intermediate plate;

a second intermediate plate interposed between said upper resilient element and said housing;

said upper resilient element being attached by vulcanization to said second intermediate plate;

a metal plate being disposed on said upper resilient element and facing generally towards said partition means;

and air chamber formed within said upper resilient element, said air chamber for containing air;

a vent hole disposed through said housing for venting said air chamber through said housing element;

said insert being movably disposed within said recess;

said movable connecting element having a threaded member disposed therewithin for connecting said movable connecting element to a member;

said head portion of said movable connecting element having a generally flat face portion forming said truncated sphere shape, said generally flat face portion facing generally towards said partition means;

said lower resilient element completely surrounding said movable connecting element;

said lower resilient element having a ring portion and a valley portion upon said face portion of said movable connecting element, said ring portion being disposed about said valley portion;

said ring portion generally having a greater thickness than said valley portion;

said head portion of said movable connecting element having an edge portion about said truncated sphere shape;

said edge portion being generally rounded;

said lower resilient element having a reduced thickness about said edge portion;

a trough portion surrounding said movable connecting element, said trough portion being intended in said lower resilient element such that said lower fluid cavity completely surrounds said movable connecting element;

a reinforcement plate being disposed within said lower resilient element;

said housing comprising an upper portion and a lower portion connected to said upper portion;

said upper portion and said lower portion of said housing connecting to form a flange portion, said flange portion being disposed generally outwardly from said housing;

a portion of each of said lower resilient element, said second portion of said partition means, said first intermediate plate and said second intermediate plate being disposed within said flange portion;

said second portion of said partition means being tapered between said lower resilient and said second intermediate plate generally within said flange portion;

said throttle means comprising a circumferential passage, said circumferential passage being disposed within said second portion of said partition means;

said circumferential passage having a generally rectangular cross-section;

said third portion of said partition means being defined by an upper concave portion and a lower concave portion, said upper concave portion and said lower concave portion converging to form an area of reduced thickness;

said first portion of said partition means having generally curved edges;

said metal plate having a circular cap portion and a sloping side portion, said sloping side portion sloping away from said circular cap portion such that said metal plate is generally in the shape of a bowl;

said upper resilient element being generally convex towards said air chamber;

said recess comprising an entry hole and a main recess chamber, said entry hole providing fluid communication between said lower fluid cavity and said main recess chamber;

said insert having an outer portion and a bulged, inner portion, said bulged, inner portion having a greater thickness than said outer portion;
said neck portion of said movable connecting element having a diameter of about ⅞ inch;
said head portion of said movable connecting element having a radius of curvature of about 2¼ inches;
said flat portion of said head portion generally having a diameter of about 1¾ inches;
said flat portion having a recessed valley portion having a depth of about 1/32 inch and a diameter of about 1 1/16 inches;
said valley portion of said lower resilient element having a minimum thickness of about ½ inch;
said ring portion of said lower resilient element having a said air chamber for containing air;
a vent hole disposed through said housing for venting said air chamber through said housing element;
said insert being movably disposed within said recess;
said movable connecting element having a threaded member disposed therewithin for connecting said movable connecting element to a member;
said head portion of said movable connecting element having a generally flat face portion forming said truncated sphere shape, said generally flat face portion facing generally towards said partition means;
said lower resilient element completely surrounding said movable connecting element;
said lower resilient element having a ring portion and a valley portion upon said face portion of said movable connecting element, said ring portion being disposed about said valley portion;
said ring portion generally having a greater thickness than said valley portion;
said head portion of said movable connecting element having an edge portion about said truncated sphere shape;
said edge portion being generally rounded;
said lower resilient element having a reduced thickness about said edge portion;
a trough portion surrounding said movable connecting element, said trough portion being indented in said lower resilient element such that said lower fluid cavity completely surrounds said movable connecting element;
said housing comprising an upper portion and a lower portion connected to said upper portion;
said upper portion and said lower portion of said housing communication between said first fluid cavity and said circumferential passage of said throttle passage;
at least one of said at least one hole providing fluid communication between said second fluid cavity and said circumferential passage of said throttle means;
said upper portion of said housing element having a protruding portion accommodating said circumferential passage of said throttle means;
said second portion of said partition means having a thickness of about 3/32 inch between said circumferential passage and said second intermediate plate;
said second intermediate plate having a thickness of about 1/16 inch;
said lower surface of said portion means having a curved portion adjacent said lower resilient member, said curved portion being disposed at a base of said generally arched cross-sectional shape and having a radius of curvature of about 5/32 inch;
said lower concave portion of said third portion of said partition means having a radius of curvature of about 2 inches;
said upper concave portion of said third portion of said partition means having a radius of curvature of about 2½ inches;
said area of reduced thickness of said third portion of said portion means having a thickness of about 3/16 inch;
said first portion of said partition manes having a diameter of about 1⅝ inches;
said first portion of said partition means generally having a thickness of about 7/16 inch;
said metal plate having a thickness of about 1/16 inch;
said cap portion of said metal plate having a diameter of about 1⅝ inch;
said sloping side portion of said metal plate having a linear dimension of about ¾ inch;
said sloping side portion of said metal plate having a rim portion, said rim portion being substantially short and being generally parallel to the longitudinal axis of the bearing;
a trough being indented in said upper resilient element;
said trough of said upper resilient element having a radius of curvature of about 3/16 inch;
said upper resilient element substantially covering all of one side of said metal plate;
said upper resilient element having an area of reduced thickness between said air chamber and said metal plate in the vicinity of a junction between said cap portion and said sloping said portion of said metal plate;
said area of reduced thickness of said upper resilient element having a thickness of about 1/32 inch;
said upper resilient element having a thickness of about 3/16 inch at the longitudinal axis of the bearing;
said convex portion of said upper resilient element having a radius of curvature of about 3½ inches;
said entry hole of said recess having a diameter of about ⅝ inch;
said entry hole of said recess having a depth of about ⅛ inch;
said bulged inner portion of said insert having diameter of about ⅝ inch and a thickness of about ⅛ inch; and
said outer portion of said insert generally having a thickness of about 1/16 inch.

17. A bearing comprising:
a housing element;
a movable connecting element for connecting the bearing to a member, said movable connecting element being movably disposed at least partly within said housing element;
said movable connecting element generally being positioned in a spaced-apart relationship with said housing element;
a lower resilience element connected between said movable connecting element and said housing element for transmitting a force between said movable connecting element and said housing element during movement of said movable connecting element;
fluid in communication with said movable connecting element and said housing element for transmitting a force between said movable connecting element and said housing element during movement of said movable connecting element;

a greater fluid cavity defined by said movable connecting element, said lower resilient element and said housing element, said fluid being disposed within said greater fluid cavity;

an upper resilient element attached to said housing element for receiving a force transmitted by said fluid;

said movable connecting element having a shaft portion and a head portion attached to said shaft portion;

a longitudinal axis being defined through and generally parallel to said shaft portion of said movable connecting element;

said head portion of said movable connecting element being at least partly spherical;

said movable connecting element being disposed for at least:
movement in a first linear direction;
movement in a second linear direction generally opposite said first linear direction;
rotational movement about said longitudinal axis;
rotational movement about at least one other axis generally transverse to said longitudinal axis;

partition means separating said greater fluid cavity into at least an upper fluid cavity and a lower fluid cavity, said partition means being disposed between said movable connecting element and said upper resilient element;

said partition means having throttle means for conveying fluid between said upper fluid cavity and said lower fluid cavity;

said partition means being positioned is a spaced-apart relationship with each of said upper resilient element and said movable connecting element;

said throttle means comprising a throttle passage, said throttle passage being in communication with each of said upper fluid cavity and said lower fluid cavity, said throttle passage forming a spiral about said longitudinal axis;

said partition means having a recess in communication with said lower fluid cavity;

an insert being disposed within said recess and substantially across said recess;

said lower resilient element being prestressed in tension by said movable connecting element;

the bearing being generally rotationally symmetrical about the longitudinal axis of the bearing;

said head portion of said movable connecting element being generally in the shape of a truncated sphere;

said lower fluid cavity completely surrounding said movable connecting element;

said partition means comprising:
a first portion being disposed along the circumference of the housing element and being connected thereto;
a second portion being disposed directly about the longitudinal axis of the bearing, said second portion having a thickness; and
a third portion connecting said first portion and said second portion; said third portion generally having a substantially reduced thickness relative to said second portion;

said partition means having a lower surface generally facing said movable connecting element, said lower surface having a generally arched cross-sectional shape defined by said first portion, said second portion and said third portion of said partition means;

a first intermediate plate interposed between said lower resilient element and said housing;

said lower resilient element being attached by vulcanization to said first intermediate plate;

a second intermediate plate interposed between said upper resilient element and said housing;

said upper resilient element being attached by vulcanization to said second intermediate plate;

a metal plate being disposed on said upper resilient element and facing generally towards said partition means;

and air chamber formed within said upper resilient element, said air chamber for containing air;

a vent hole disposed through said housing for venting said air chamber through said housing element;

said insert being movably disposed within said recess;

said movable connecting element having a threaded member disposed therewithin for connecting said movable connecting element to a member;

said head portion of said movable connecting element having a generally flat face portion forming said truncated sphere shape, said generally flat face portion facing generally towards said partition means;

said lower resilient element completely surrounding said movable connecting element;

said lower resilient element having a ring portion and a valley portion upon said face portion of said movable connecting element, said ring portion being disposed about said valley portion;

said ring portion generally having a greater thickness than said valley portion;

said head portion of said movable connecting element having an edge portion about said truncated sphere shape;

said edge portion being generally rounded;

said lower resilient element having a reduced thickness about said edge portion;

a trough portions surrounding said movable connecting element, said trough portion being intended in said lower resilient element such that said lower fluid cavity completely surrounds said movable connecting element;

said housing comprising an upper portioned a lower portion connected to said upper portion;

said upper portion and said lower portion of said housing connecting to form a flange portion, said flange portion being disposed generally outwardly from said housing;

a portion of each of said lower resilient element, said second portion of said partition means, said first intermediate plate and said second intermediate plate being disposed within said flange portion;

said second portion of said partition means being tapered between said lower resilient and said second intermediate plate generally within said flange portion;

said throttle means comprising a main passage, said main passage having a generally rectangular cross-section;

said third portion of said portion means being defined by an upper concave portion and a lower concave portion, said upper concave portion and said lower concave portion converging to form an area of reduced thickness;

said first portion of said partition means generally curved edges;

said metal plate having a circular cap portion and a sloping side portion, said sloping side portion sloping away from said circular cap portions such that said metal plate is generally in the shape of a bowl;

said upper resilient element being generally convex toward said air chambers;

said recess comprising an entry hole and a main recess chamber, said entry hole providing fluid communication between said lower fluid cavity and said main recess chamber;

said insert having an outer portion a bulged, inner portion, said bulged, inner portion having a greater thickness than said outer portion;

said neck portion of said movable connecting element having a diameter of about ⅞ inch;

said head portion of said movable connecting element having a radius of curvature of about 1¼ inches;

said flat portion of said head portion generally having a diameter of about 1¾ inches;

said flat portion having a recessed valley portion having a depth of about 1/32 inch and a diameter of about 1 1/16 inches;

said valley portion of said lower resilient element having a minimum thickness of about ⅛ inch;

said ring portion of said lower resilient element having a maximum thickness of about 5/16 inch;

said area of reduced thickness of said lower resilient element having a thickness of about 3/64 inch;

said lower resilient element comprising a curved portion connecting said area of reduced thickness and said trough, said curved portion having a radius of curvature of about 11/16 inch;

said reinforcement plate being disposed about a halfway between said movable connecting element and said first intermediate plate;

said first intermediate plate having a thickness of about 1/16 inch;

said lower resilient element substantially covering substantially the entire surface area of said head portion of said movable connecting element;

an indentation defined by said lower resilient element, said first intermediate plate and said movable connecting element;

said lower resilient element being tapered at said neck portion of said movable connecting element to partly define said indentation;

said indentation comprising a double groove indented in said lower resilient element;

said upper portion of said housing element having a protruding portion accommodating said main passage of said throttle means;

said second portion of said portion means having a thickness of about 3/32 inch, in a direction substantially transverse to the longitudinal axis of the bearing, between said circumferential passage and said second intermediate plate;

said second intermediate plate having a thickness of about 1/16 inch;

said lower surface of said portion means having a curved portion adjacent said lower resilient member, said curved portion being disposed at a base of said generally arched cross-sectional shape and having a radius of curvature of about 5/32 inch;

said lower concave portion of said third portion of said partition means having a radius of curvature of about 2 inches;

said upper concave portion of said third portion of said partition means having a radius of curvature of about 2½ inches;

said area of reduced thickness of said third portion of said portion means having a thickness of about 3/16 inch;

said first portion of said partition manes having a diameter of about 1⅝ inches;

said first portion of said partition means generally having a thickness of about 7/16 inch;

said metal plate having a thickness of about 1/16 inch;

said cap portion of said metal plate having a diameter of about 1⅜ inch;

said sloping side portion of said metal plate having a linear dimension of about ¾ inch;

said sloping side portion of said metal plate having a rim portion, said rim portion being substantially short and being generally parallel to the longitudinal axis of the bearing;

a trough being indented in said upper resilient element;

said trough of said upper resilient element having a radius of curvature of about 3/16 inch;

said upper resilient element substantially covering all of one side of said metal plate;

said upper resilient element having an area of reduced thickness between said air chamber and said metal plate in the vicinity of a junction between said cap portion and said sloping said portion of said metal plate;

said area of reduced thickness of said upper resilient element having a thickness of about 1/32 inch;

said upper resilient element having a thickness of about 3/16 inch at the longitudinal axis of the bearing;

said convex portion of said upper resilient element having a radius of curvature of about 3½ inches;

said entry hole of said recess having a diameter of about ⅜ inch;

said entry hole of said recess having a depth of about ⅛ inch;

said bulged inner portion of said insert having diameter of about ⅜ inch and a thickness of about ⅛ inch; and said outer portion of said insert generally having a thickness of about 1/16 inch.

* * * * *

UNITED STATES PATENT AND TRADEMARK OFFICE
CERTIFICATE OF CORRECTION

PATENT NO. : 5,205,545

DATED : April 27, 1993

INVENTOR(S) : Jörn-Rainer QUAST

Page 1 of 4

It is certified that error appears in the above-indentified patent and that said Letters Patent is hereby corrected as shown below:

In column 3, line 30, after 'DESCRIPTION', delete "ON".

In column 5, line 13, after 'about', delete "1½" and insert --1 1/8--.

In column 5, line 14, after 'about', delete "½" and insert --1/8.

In column 10, line 39, Claim 1, after 'lower', delete "resilience" and insert --resilient--.

In column 11, line 40, Claim 2, after "being", insert --in--.

In column 11, line 55, Claim 6, after 'fluid', delete "activity" and insert --cavity--.

In column 12, line 2, Claim 8, after 'said', delete "portion" and insert --partition--.

In column 12, line 45, Claim 16, after 'lower', delete "resilience" and insert --resilient--.

In column 13, line 19, Claim 16, after 'positioned', delete "is" and insert --in--.

In column 13, line 65, Claim 16, before 'air', delete "and" and insert --an--.

UNITED STATES PATENT AND TRADEMARK OFFICE
CERTIFICATE OF CORRECTION

PATENT NO. : 5,205,545                              Page 2 of 4

DATED        : April 27, 1993

INVENTOR(S) : Jörn-Rainer QUAST

It is certified that error appears in the above-indentified patent and that said Letters Patent is hereby corrected as shown below:

In column 14, line 25, Claim 16, after 'being', delete "intended" and insert --indented--.

In column 15, line 14, Claim 16, after 'about', delete "½" and insert --1/8--.

In column 16, line 10, Claim 16, after 'said', delete "portion" and insert --partition--.

In column 16, line 12, Claim 16, after 'partition', delete "manes" and insert --means--.

In column 16, line 34, Claim 16, after 'sloping', delete "said" and insert --side--.

In column 16, line 61, Claim 17, after 'lower', delete "resilience" and insert --resilient--.

In column 17, line 34, Claim 17, after 'positioned', delete "is" and insert --in--.

In column 18, line 14, Claim 17, before 'air', delete "and" and insert --an--.

In column 18, line 41, Claim 17, after 'trough', delete "portions" and insert --portion--.

In column 18, line 42, after 'being', delete "intended" and insert --indented--.

UNITED STATES PATENT AND TRADEMARK OFFICE
CERTIFICATE OF CORRECTION

PATENT NO. : 5,205,545
DATED : April 27, 1993
INVENTOR(S) : Jörn-Rainer QUAST

It is certified that error appears in the above-indentified patent and that said Letters Patent is hereby corrected as shown below:

In column 18, line 46, Claim 17, after 'upper', delete "portioned" and insert --portion and--.

In column 18, line 63, Claim 17, after the second occurrence of 'said', delete "portion" and insert --partition--.

In column 19, line 8, Claim 17, before 'said', delete "toward" and insert --towards--.

In column 19, line 8, Claim 17, after 'air', delete "chambers" and insert --chamber--.

In column 19, line 13, after 'portion', insert --and--.

In column 19, line 19, Claim 17, after 'about', delete "1¼" and insert --2¼--.

In column 19, line 37, Claim 17, after 'about', delete "a".

In column 19, line 57, Claim 17, after the second occurrence of 'said', delete "portion" and insert --partition--.

In column 20, line 5, Claim 17, after the second occurrence of 'said', delete "portion" and insert --partition--.

UNITED STATES PATENT AND TRADEMARK OFFICE
CERTIFICATE OF CORRECTION

PATENT NO. : 5,205,545
DATED : April 27, 1993
INVENTOR(S) : Jörn-Rainer QUAST

It is certified that error appears in the above-indentified patent and that said Letters Patent is hereby corrected as shown below:

In column 20, line 17, Claim 17, after 'said', delete "portion" and insert --partition--.

In column 20, line 19, Claim 17, after 'partition', delete "manes" and insert --means--.

In column 20, line 41, Claim 17, after 'sloping', delete "said" and insert --side--.

Signed and Sealed this

Twenty-fourth Day of September, 1996

Attest:

BRUCE LEHMAN

Attesting Officer     Commissioner of Patents and Trademarks